(12) United States Patent
Fairfield et al.

(10) Patent No.: US 10,093,311 B2
(45) Date of Patent: Oct. 9, 2018

(54) TESTING PREDICTIONS FOR AUTONOMOUS VEHICLES

(71) Applicant: Waymo LLC, Mountain View, CA (US)

(72) Inventors: Nathaniel Fairfield, Mountain View, CA (US); Vadim Furman, Los Gatos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/202,698

(22) Filed: Jul. 6, 2016

(65) Prior Publication Data
US 2018/0011496 A1 Jan. 11, 2018

(51) Int. Cl.
| | |
|---|---|
| G05D 1/02 | (2006.01) |
| B60W 40/09 | (2012.01) |
| B60W 30/09 | (2012.01) |
| B60W 30/18 | (2012.01) |
| G08G 1/16 | (2006.01) |

(52) U.S. Cl.
CPC ...... B60W 30/09 (2013.01); B60W 30/18154 (2013.01); B60W 30/18163 (2013.01); G05D 1/0289 (2013.01); G08G 1/167 (2013.01); G05D 2201/0213 (2013.01)

(58) Field of Classification Search
CPC ............................. G05D 1/0221; B60W 40/09
USPC ..... 701/25, 23, 301, 93, 1, 96; 340/435, 903
See application file for complete search history.

(56) References Cited

U.S. PATENT DOCUMENTS

| | | | |
|---|---|---|---|
| 8,660,734 B2* | 2/2014 | Zhu | ...................... G05D 1/0055 |
| | | | 701/23 |
| 9,132,840 B1 | 9/2015 | Szybalski et al. | |
| 9,201,421 B1 | 12/2015 | Fairfield et al. | |
| 9,381,916 B1 | 7/2016 | Zhu et al. | |

(Continued)

FOREIGN PATENT DOCUMENTS

WO   2016094088 A1   6/2016

OTHER PUBLICATIONS

Al-Shihabi, Talal et al., "A Framework for Modeling Human-like Driving Behaviors for Autonomous Vehicles in Driving Simulators" (2001), 6pgs.

(Continued)

*Primary Examiner* — Marthe Y Marc-Coleman
(74) *Attorney, Agent, or Firm* — Lerner, David, Littenberg, Krumholz & Mentlik, LLP

(57) ABSTRACT

Testing predictions of an autonomous vehicle relating to another vehicle or object in a roadway is provided. For instance, one or more processors may plan to maneuver the autonomous vehicle to complete an action and predict that the other vehicle will take a responsive action. The autonomous vehicle is then maneuvered towards completing the action in a way that would allow the autonomous vehicle to cancel completing the action without causing a collision between the first vehicle and the second vehicle, and in order to indicate to the second vehicle or a driver of the second vehicle that the first vehicle is attempting to complete the action. Thereafter, when the first vehicle is determined to be able to take the action, the action is completed by controlling the first vehicle autonomously using the determination of whether the second vehicle begins to take the particular responsive action.

20 Claims, 14 Drawing Sheets

(56) References Cited

U.S. PATENT DOCUMENTS

| | | | |
|---|---|---|---|
| 2008/0133136 A1* | 6/2008 | Breed | B60N 2/2863 |
| | | | 701/301 |
| 2011/0102195 A1 | 5/2011 | Kushi et al. | |
| 2012/0065858 A1* | 3/2012 | Nickolaou | B60Q 9/008 |
| | | | 701/70 |
| 2014/0142799 A1* | 5/2014 | Ferguson | G05D 1/00 |
| | | | 701/23 |
| 2015/0166062 A1 | 6/2015 | Johnson et al. | |
| 2015/0336502 A1 | 11/2015 | Hillis et al. | |
| 2016/0272207 A1* | 9/2016 | Dolgov | B60W 30/16 |
| 2017/0113683 A1* | 4/2017 | Mudalige | B60W 30/08 |

OTHER PUBLICATIONS

International Search Report and Written Opinion for PCT Application No. PCT/US2017/039717 dated Oct. 26, 2017. 16 pages.

\* cited by examiner

TESTING PREDICTIONS FOR AUTONOMOUS VEHICLES

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

Typically when vehicles that drive fully autonomously or in an autonomous mode encounter other vehicles or objects on a roadway, these vehicles are programmed to operate as safely as possible. In other words, these vehicles tend to "err" on the side of being less assertive when pulling out in front of other vehicles to make turns, etc. However, in many situations, this preference for safety and less assertive behaviors can lead to delays in operation and annoyances to passengers-especially those in which vehicle or pedestrian congestion is relatively high. At the same time, making more assertive maneuvers, such as pulling out in front of another vehicle, which would require the other vehicle to slow down, change direction, or make some other responsive maneuver, is inherently dangerous. As an example, assuming the other vehicle is controlled by a human driver, if the vehicle in the autonomous mode pulls in front of the other vehicle, the human driver may not react soon enough to slow the other vehicle down, change direction, etc. in order to avoid a collision. Thus, there is a delicate balance between increasing the assertive nature of these autonomous vehicles and compromising on safety.

BRIEF SUMMARY

One aspect of the disclosure provides a method of controlling a first vehicle autonomously. The method includes planning, by one or more processors, to maneuver the first vehicle to complete an action; predicting that a second vehicle will take a responsive action; maneuvering, by the one or more processors, the first vehicle towards completing the action in a way that would allow the first vehicle to cancel completing the action prior without causing a collision between the first vehicle and the second vehicle, and in order to indicate to the second vehicle or a driver of the second vehicle that the first vehicle is attempting to complete the action; determining, by the one or more processors, whether the second vehicle is taking the particular responsive action in response to the maneuvering; and when the first vehicle is determined to be able to take the action, completing the action, by the one or more processors, by controlling the first vehicle autonomously using the determination of whether the second vehicle begins to take the particular responsive action.

In one example, the action is making a right turn from a first roadway to a second roadway in order to pull in front of the second vehicle on the second roadway. In another example, the action is making a left turn from a first roadway to leave the first roadway and requires crossing in front of the second vehicle on the first roadway. In this example, the action is making a left turn into a parking lot or driveway. Alternatively, the action is making a left turn onto a second roadway at an intersection.

In another example, the second vehicle is in a same lane as the first vehicle and the action is passing the second vehicle. In another example, the particular responsive action includes slowing the second vehicle down to a particular speed. In another example, the particular responsive action includes changing a current lane of the second vehicle. In another example, when the second vehicle is determined to have begun to take the particular responsive action, the action is completed before a time when the second vehicle would have passed by the first vehicle had the first vehicle not completed the action. In another example, the method also includes controlling, by the one or more processors, the first vehicle autonomously along a route, and prior to maneuver the first vehicle to complete the action, determining, by the one or more processors, that the first vehicle must take the action to proceed along the route. In another example, predicting that the second vehicle will take the responsive action includes generating a prediction that the second vehicle will take the particular responsive action which would allow the first vehicle to comply with accommodation protocols of the first vehicle if the first vehicle were to complete the action at a particular point in time, wherein the accommodation protocols prohibit actions by the first vehicle which would require certain types of responsive actions by another vehicle.

Another aspect of the disclosure provides a system for controlling a first vehicle autonomously. The system includes one or more processors configured to plan to maneuver the first vehicle to complete an action; predict that a second vehicle will take a responsive action; maneuver the first vehicle towards completing the action in a way that would allow the first vehicle to cancel completing the action without causing a collision between the first vehicle and the second vehicle, and in order to indicate to the second vehicle or a driver of the second vehicle that the first vehicle is attempting to complete the action; determine whether the second vehicle is taking the particular responsive action in response to the maneuvering; and when the first vehicle is determined to be able to take the action, complete the action by controlling the first vehicle autonomously using the determination of whether the second vehicle begins to take the particular responsive action.

In one example, the particular responsive action includes slowing the second vehicle down to a particular speed. In another example, the particular responsive action includes changing a current lane of the second vehicle. In another example, when the second vehicle is determined to have begun to take the particular responsive action, the one or more processors are configured to complete the action before a time when the second vehicle would have passed by the first vehicle had the first vehicle not completed the action. In another example, the one or more processors are further configured to, prior to the maneuvering, predict that the second vehicle is likely to take the particular responsive action. In another example, the action is making a right turn from a first roadway to a second roadway in order to pull in front of the second vehicle on the second roadway. In another example, the action is making a left turn from a first roadway to leave the first roadway and requires crossing in front of the second vehicle on the first roadway. In another example, the action is making a left turn into a parking lot or driveway.

A further aspect of the disclosure provides a non-transitory computer readable storage medium on which instructions are stored. The instructions, when executed by one or more processors cause the one or more processors to perform a method of controlling a first vehicle autonomously. The method includes planning, by one or more processors, to maneuver the first vehicle to complete an action; predicting that a second vehicle will take a responsive action; maneuvering, by the one or more processors, the first vehicle towards completing the action in a way that would allow the first vehicle to cancel completing the action without causing a collision between the first vehicle and the second vehicle, and in order to indicate to the second vehicle or a driver of the second vehicle that the first vehicle is attempting to complete the action; determining, by the one or more processors, whether the second vehicle is taking the particular responsive action in response to the maneuvering; and when the first vehicle is determined to be able to take the action, completing the action, by the one or more processors, by controlling the first vehicle autonomously using the determination of whether the second vehicle begins to take the particular responsive action.

DETAILED DESCRIPTION

Figure 1:
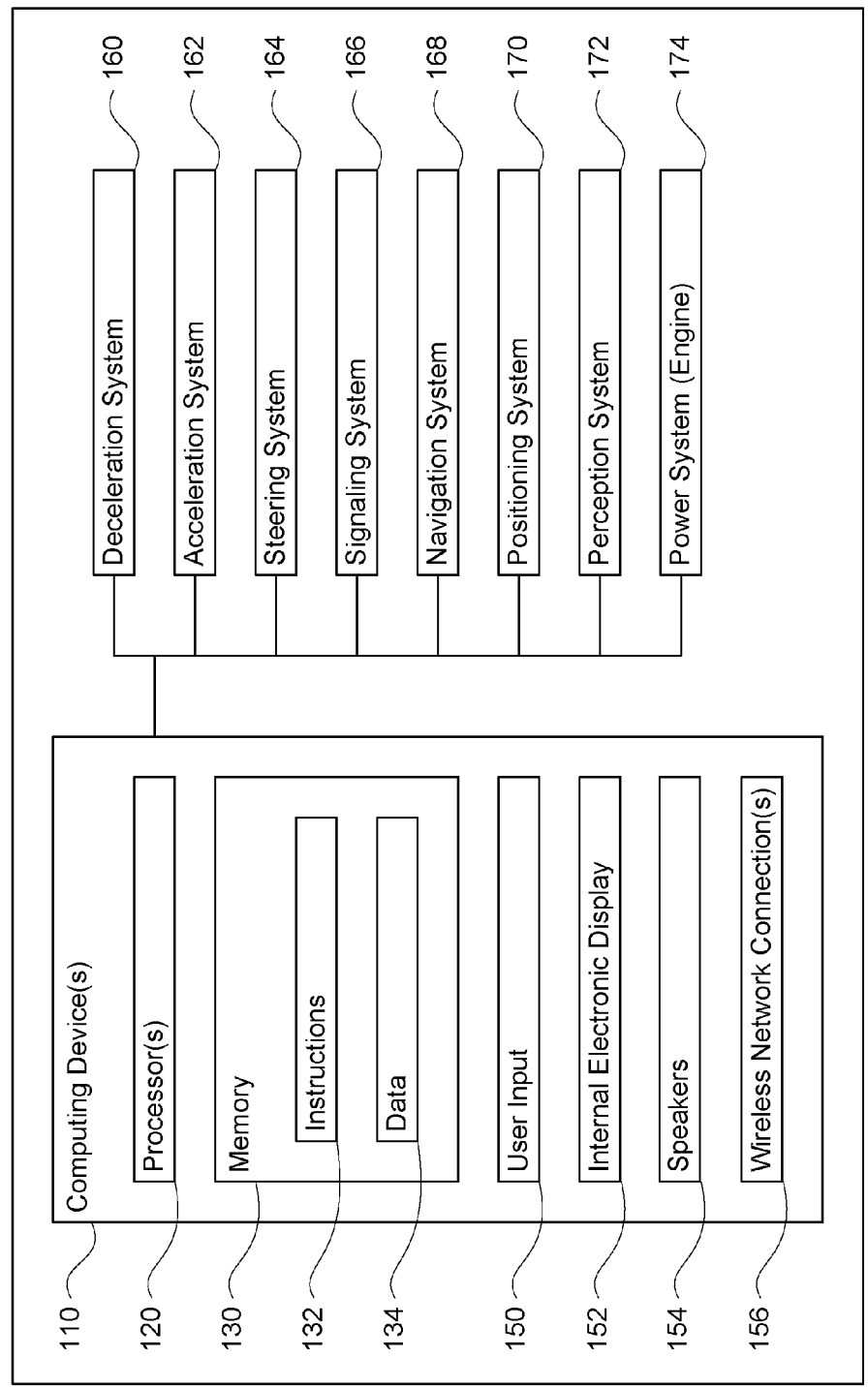
FIG. 1 is a functional diagram of an example vehicle in accordance with aspects of the disclosure.

In order to increase the likelihood that the other vehicle will react safely to an action of the autonomous vehicle, the autonomous vehicle may first predict what will occur if the vehicle were to take the action. As an example, an action may include making a left turn in front of another vehicle (turning left in front of someone), passing another vehicle (i.e. on a town lane road), or making a right turn in front of a vehicle (pulling out in front of the vehicle) in order to follow a particular route to a destination. In these examples, the prediction may indicate that the autonomous vehicle would be able to complete the behavior safely (i.e. not coming within a certain distance of the other vehicle depending upon the speed of the vehicles) so long as the other vehicle took some responsive action, such as slowing down, etc. Thus, because the action would require the other vehicle to take some action, the action may be considered an assertive action. In this regard, if the action was not an assertive action, the autonomous vehicle would simply complete the action.

The predictions themselves may be based on behavior models for the type of object. These behavior models may be pre-stored and configured to provide one or more predictive behavior outcomes for the type of object given a particular scenario. These behavior models may thus be created from human studies, intuition about how objects will behave, learned from data gathered by the vehicle's perception system. The behavior models may provide prediction information, for instance, include expected reaction times, speed changes, changes in headings, etc.

Next the autonomous vehicle may act to "test" the prediction for the assertive behavior. This action may include physically initiating a turn or movement around a vehicle, but doing so and then stopping (where appropriate) or slowing down so as to not fully commit to the assertive action. This act may be a very small step towards completing the action, but is sufficient to put the other vehicle on notice that the autonomous vehicle intends to complete the assertive action. In other words, a very small movement towards completing the assertive action can put other human drivers on notice of the vehicle's "intention" to complete the assertive action as soon as possible. Moreover, because the autonomous vehicle still has time to make a decision as to whether or not to actually make the assertive action, the vehicle's computers can delay completing the assertive action and leave room to stop completely and not complete the assertive action.

Once the vehicle has acted to test the prediction, the autonomous vehicle's computers may determine whether the other object has begun to take the responsive action according to the prediction. If this does not occur according to the prediction or occurs too late, because the autonomous vehicle has only taken some small step towards the aggressive behavior, the autonomous vehicle may "abort" the aggressive behavior. In this way, the autonomous vehicle can act to prevent an accident or the vehicles coming too close to one another.

If the other vehicle does begin to take the responsive action, and for instance slows down according to the prediction, the autonomous vehicle may fully commit to the aggressive behavior and proceed. In this way, the autonomous vehicle can be more certain that the aggressive behavior is understood by the other vehicle and can be completed safely.

The features described herein may allow the autonomous vehicle to drive with more finesse or rather, more like a human driver. This, in turn, can make the experience as a passenger in the vehicle less stressful and annoying, without compromising on safety as discussed above.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store behavior models. The behavior models may be configured to provide predictions for the actions of specific types of objects such as different vehicles (passenger vehicle, motorcycles, large trucks (e.g. tractor trailers), busses, etc.) or pedestrians or bicyclists. These behavior models may thus be created from human studies, intuition about how objects will behave, learned from data gathered by the vehicle's perception system. The behavior models may provide prediction information, for instance, include expected reaction times, speed changes (how quickly will the object accelerate or decelerate and how aggressively will the object brake or accelerate), changes in headings, etc.

The data may also store accommodation protocols for the vehicle. For instance, in addition to abiding by legal requirements, such as speed limits, traffic signals, turning lanes, etc. which may be incorporated into the map information discussed below, the accommodation protocols may include addition requirements for a vehicle intended to allow the vehicle to operate in a way which promotes the comfort and security of a passenger of the vehicle.

For instance, the accommodation protocols may require that when vehicle 100 makes a turn in front of another vehicle, the two vehicles may come no closer than some predetermined distance such as 5 to 10 meters. While this may not be a "legal" requirement, having such accommodation protocols allows passengers of vehicle 100 (as well as other vehicles on the roadway) to feel safe and more comfortable. As another example, the accommodation protocols may require that any actions of the vehicle 100 may not require other vehicles to take actions which would compromise the comfort and security of passengers of the other vehicles. For instance, the vehicle may not take an action that would require another vehicle to change that other vehicle's current behavior "too much". In other words, the accommodation protocols may limit an amount of action or type of action by another vehicle in response to an action by the vehicle 100. As an example, if an accommodation protocol would be violated by an action of the vehicle 100, the vehicle's computing devices may prohibit the vehicle 100 from taking that action. For instance, actions that would require another vehicle to accelerate or decelerate too quickly (too high a rate of acceleration or deceleration would be uncomfortable for passengers), change lanes or drive on a shoulder, or drive in a way which is contrary to legal requirements for vehicles such as at too high a speed or making an illegal turn in order to avoid a collision would be prohibited by the accommodation protocols. At the same time, however, some actions by the vehicle 100 which would cause smaller amounts of deceleration or acceleration by another vehicle, as discussed further below, may be acceptable according to or fall within the accommodation protocols.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location.

The computing device 110 may control the direction and speed of the vehicle by controlling various components. By way of example, computing device 110 may navigate the vehicle to a destination location completely autonomously using data from map information and navigation system 168 (discussed further below). The computing device 110 may use the positioning system 170 to determine the vehicle's location and perception system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computer 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

Figure 2:
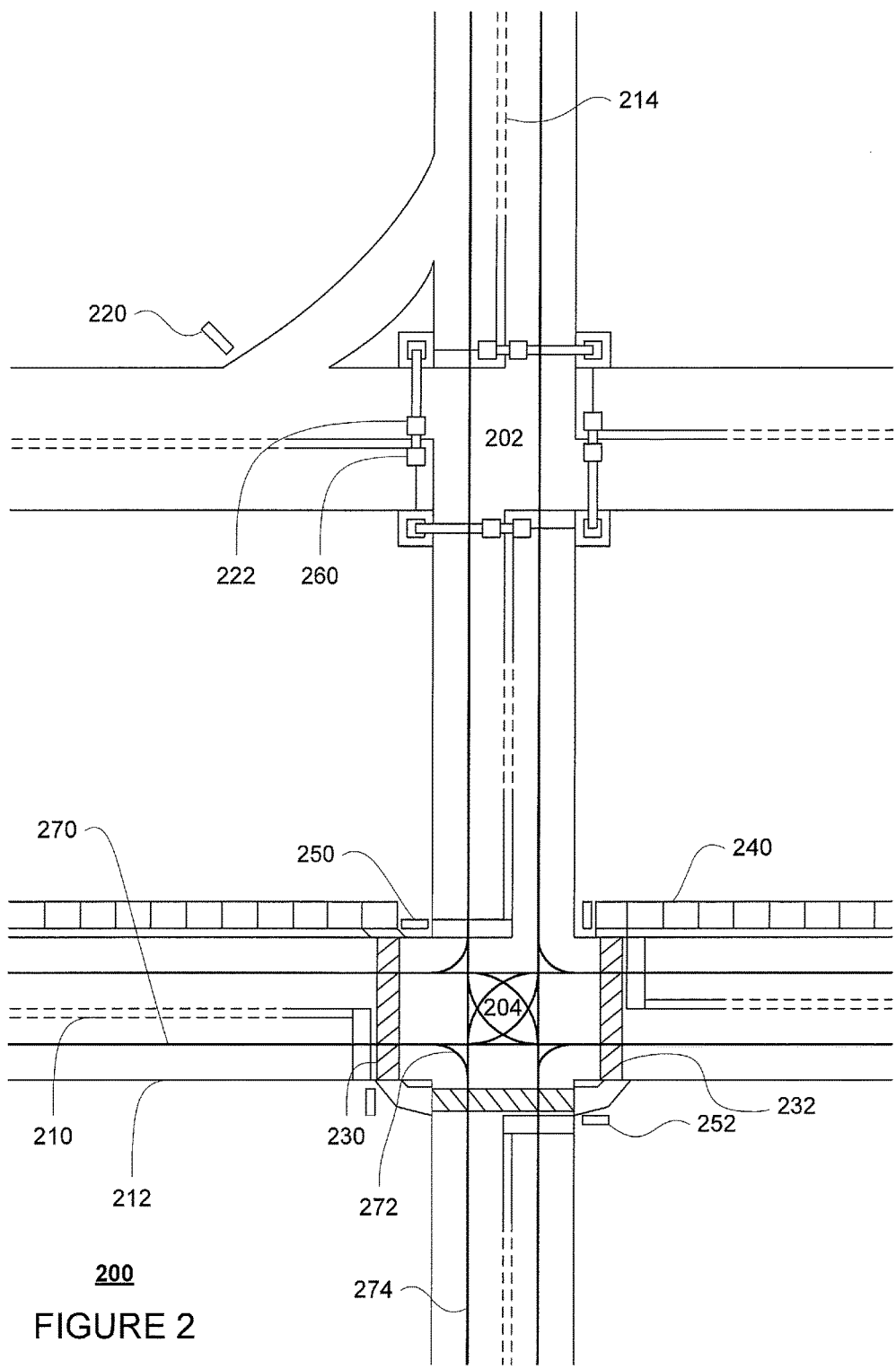
FIG. 2 is an example representation of detailed map information in accordance with aspects of the disclosure.
Figure 3A:
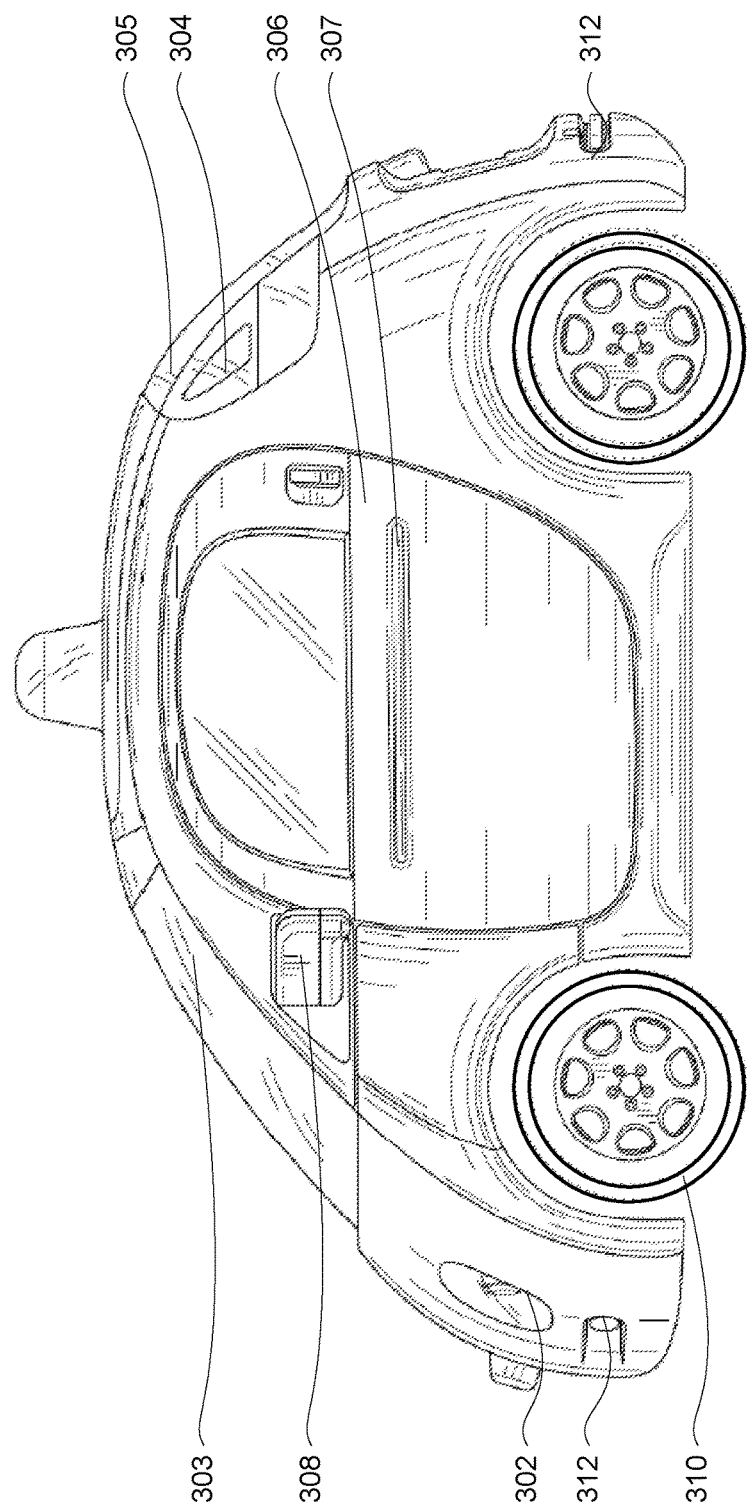
FIGS. 3A-3D are example external views of a vehicle in accordance with aspects of the disclosure.
Figure 3C:
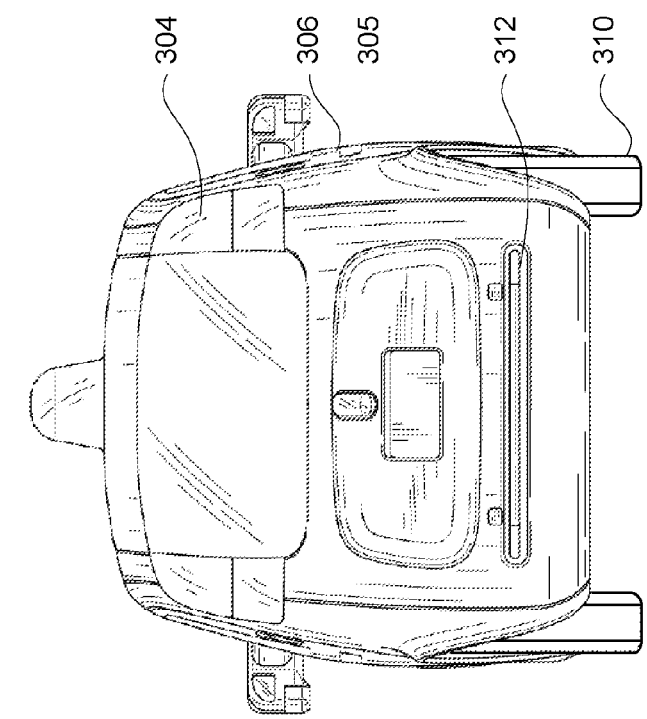
Figure 3B:
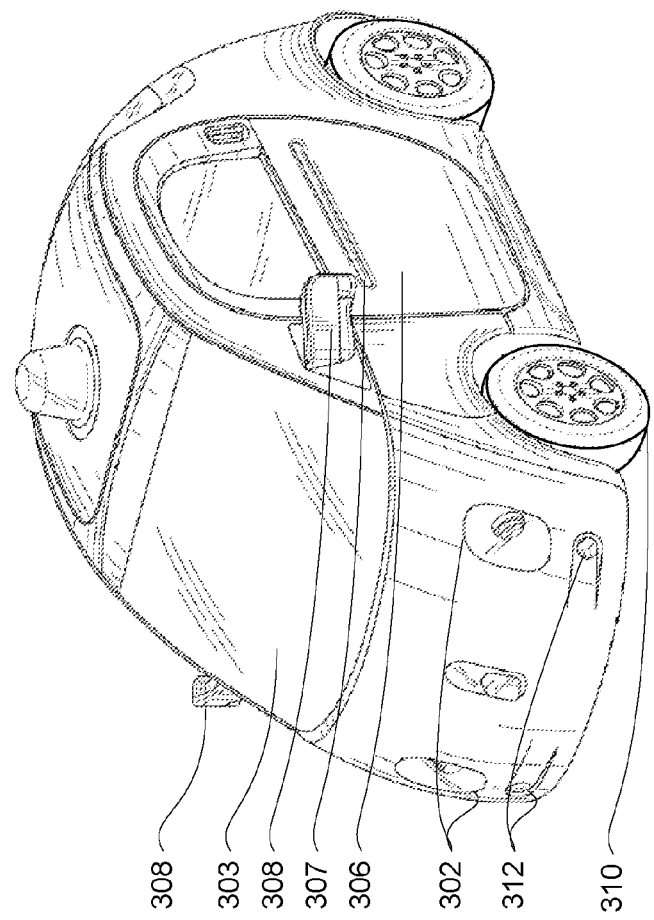
Figure 3D:
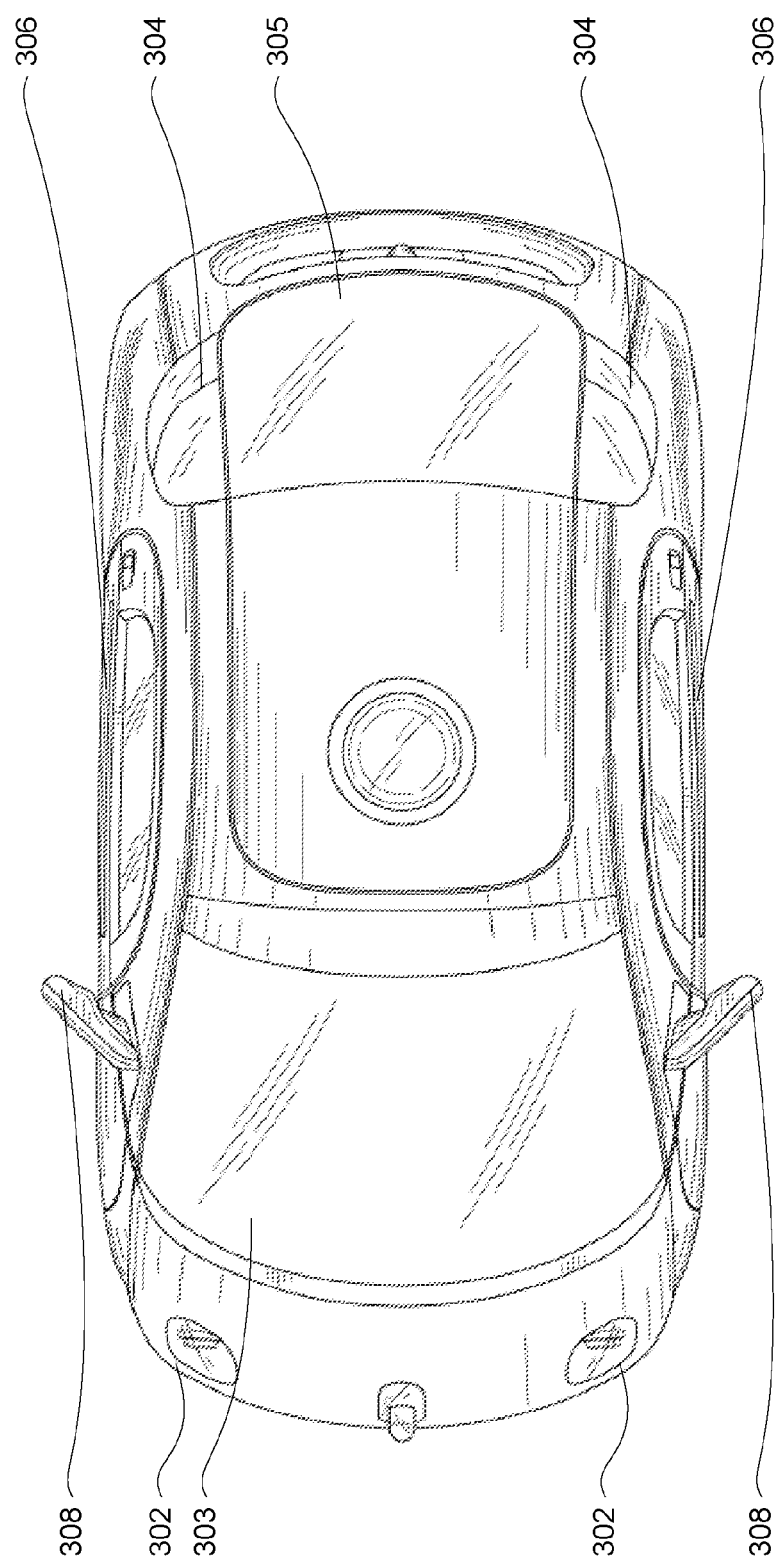

FIG. 2 is an example of map information 200 for a section of roadway including intersections 202 and 204. In this example, the detailed map information 200 includes information identifying the shape, location, and other characteristics of lane lines 210, 212, 214, traffic signal lights 220, 222, crosswalks 230, 232, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. As noted above, vehicle 100 may include various speakers arranged on the external surfaces of the vehicle corresponding to the one or more speakers 154 as noted above.

Figure 4:
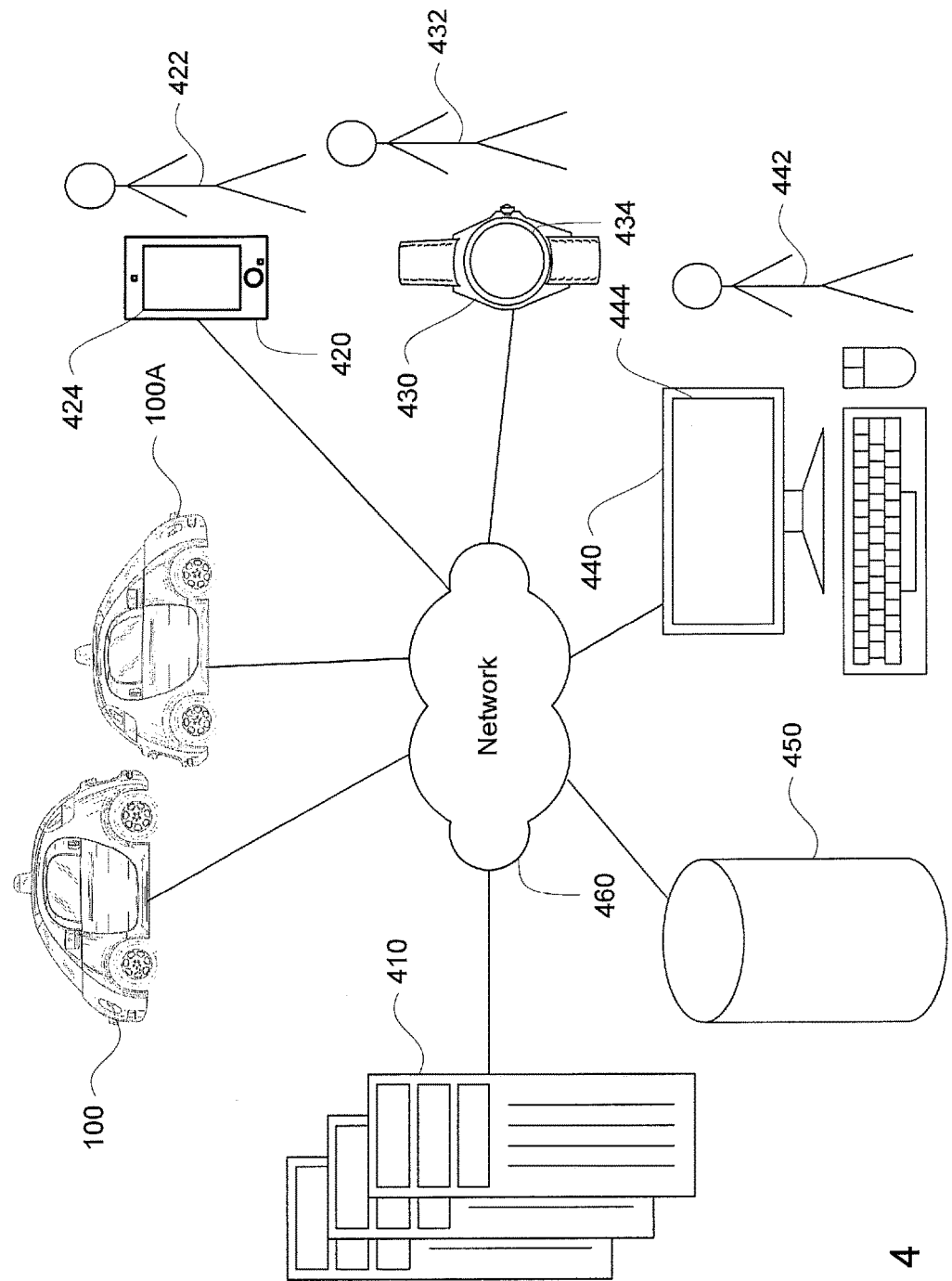
FIG. 4 is a functional diagram of an example system in accordance with an exemplary embodiment.
Figure 5:
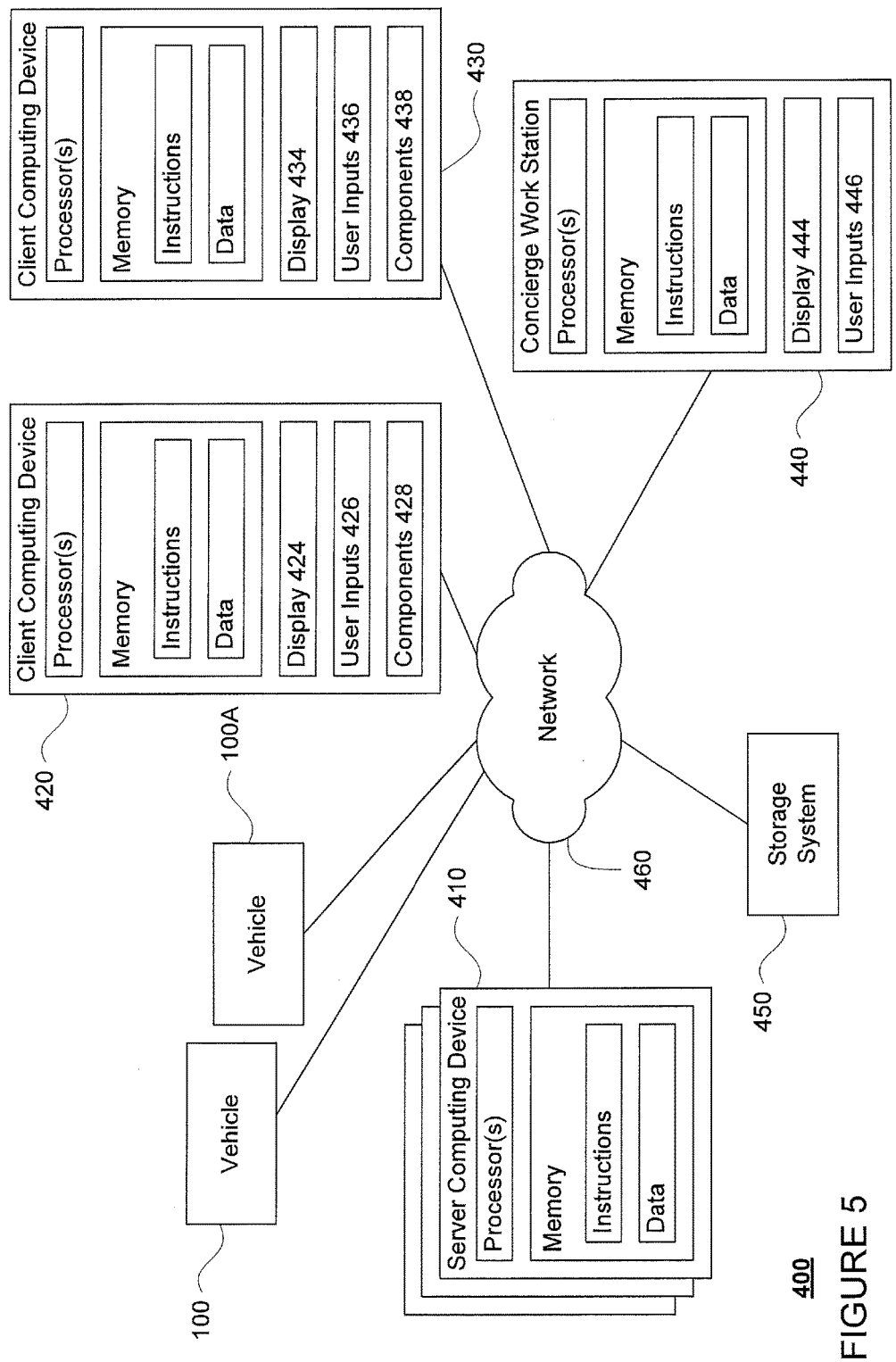
FIG. 5 is a pictorial diagram of the system of FIG. 6 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 440. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces 156.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 110 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, laptop, or a netbook that is capable of obtaining information via the Internet or other networks. In another example, client computing device 430 may be a wearable computing device, such as a "smart watch" as shown in FIG. 4. As an example the user may input information using a keyboard, a keypad, a multi-function input button, a microphone, visual signals (for instance, hand or other gestures) with a camera or other sensors, a touch screen, etc.

In some examples, client computing device 440 may be concierge work station used by an administrator to provide concierge services to users such as users 422 and 432. For example, a concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. The request may include information identifying a pickup location or area and/or a destination location or area. In response the one or more server computing devices 410 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. Once the user, now passenger, is safely in the vehicle, the computer 110 may initiate the necessary systems to control the vehicle autonomously along a route to the destination location. For instance, the navigation system 168 may use the map information of data 134 to determine a route or path to the destination location that follows a set of connected rails of map information 200. The computing devices 110 may then maneuver the vehicle autonomously (or in an autonomous driving mode) as described above along the route towards the destination.

In order to proceed along the route, the computing devices 110 may determine that the first vehicle must take a particular action. For instance, an action may include making a left turn onto another roadway, parking lot or driveway, passing another vehicle where the other vehicle is driving erratically or well below the speed limit, or making a right turn onto another roadway. Many of these actions may be completed by simply waiting, for instance, until there are no other vehicles around with which there is any likelihood of a collision. However, especially in high traffic areas, this type of tactic can be frustrating for passengers and cause undue delays. In that regard, rather than simply waiting, the vehicle may determine whether it can take a more assertive action, for instance by making a turn in front of a vehicle (pulling out in front of the vehicle), proceeding into a bottleneck, finding a gap between two vehicles (for instance when changing lanes), proceeding through an intersection with a multi-way stop (i.e. a four or two-way stop), or passing a vehicle in order to follow a particular route to a destination. Of course, in many situations, taking a more assertive action can be dependent upon how other vehicles on the roadway are likely to respond to that assertive action.

FIGS. 6-11 are examples of different situations in which a vehicle may need to take such an assertive action, such as those noted above, in order to proceed along a route and avoid uncomfortable or inconvenient delays for any passenger or passengers of the vehicle. The examples are not intended to be limiting, but provide real-world situations in which an autonomous vehicle may take an assertive behavior. In that regard, the examples are somewhat simplified and do not depict all situations in which the features described herein may be utilized. In addition, the examples provided herein are specific to left-hand drive countries, but may be equally as relevant to right-hand drive countries (assuming the directions of lanes and turns were reversed, etc.).

Each of the examples depicts a section of roadway 600 including intersections 602 and 604. In this example, intersections 602 and 604 corresponds to intersections 202 and 204 of the map information 200, respectively. In this example, lane lines 610, 612, and 614 correspond to the shape, location, and other characteristics of lane lines 210, 212, and 214, respectively. Similarly, crosswalks 630 and 632 correspond to the shape, location, and other characteristics of crosswalks 230 and 232, respectively; sidewalks 640 correspond to sidewalks 240; traffic signal lights 620 and 622 correspond to traffic signal lights 220 and 222, respectively; stop signs 650, 652 correspond to stop signs 250, 252, respectively; and yield sign 660 corresponds to yield sign 260.

Figure 6:
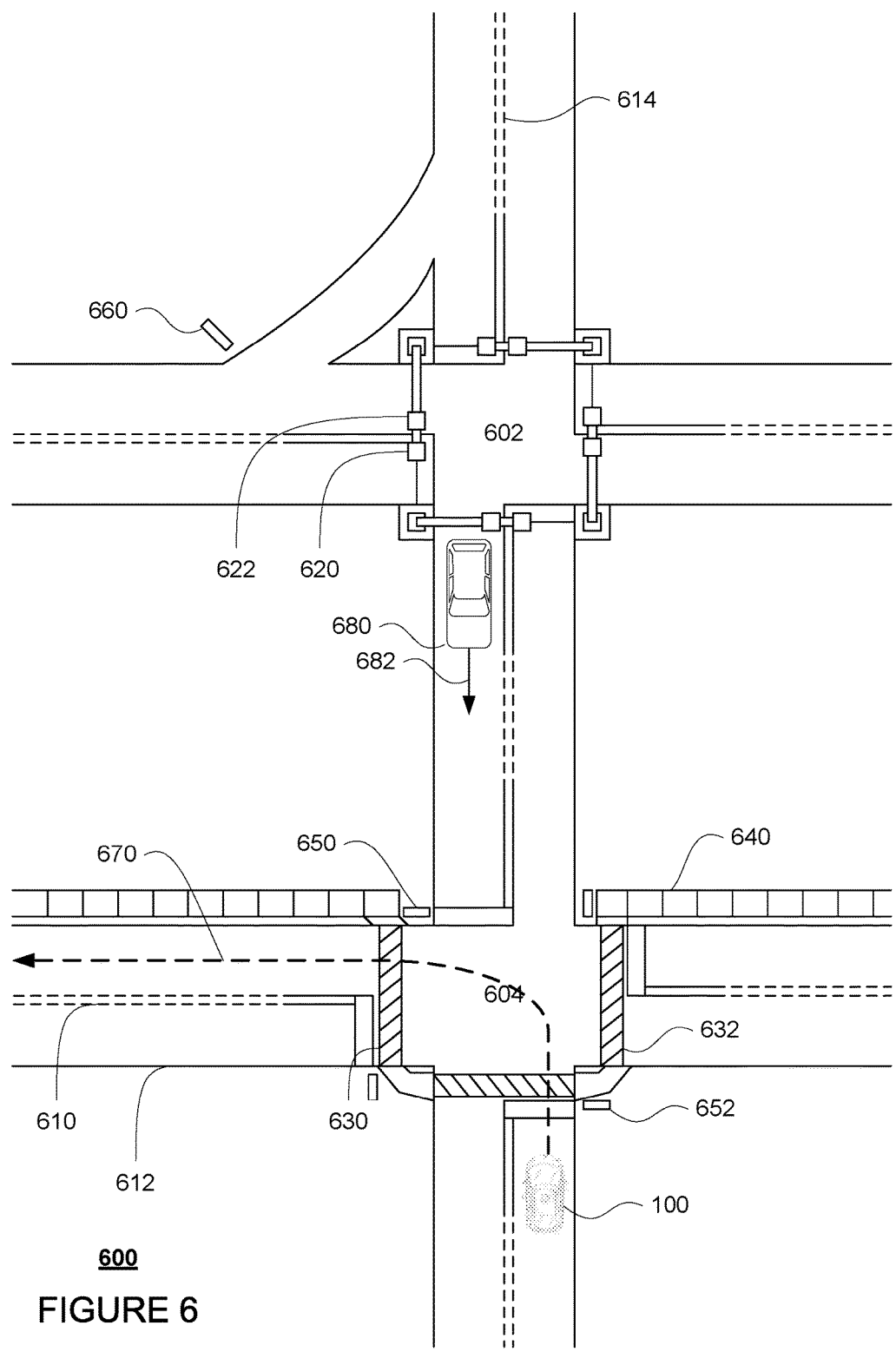
FIGS. 6-11 are example situations in accordance with aspects of the disclosure.
Figure 7:
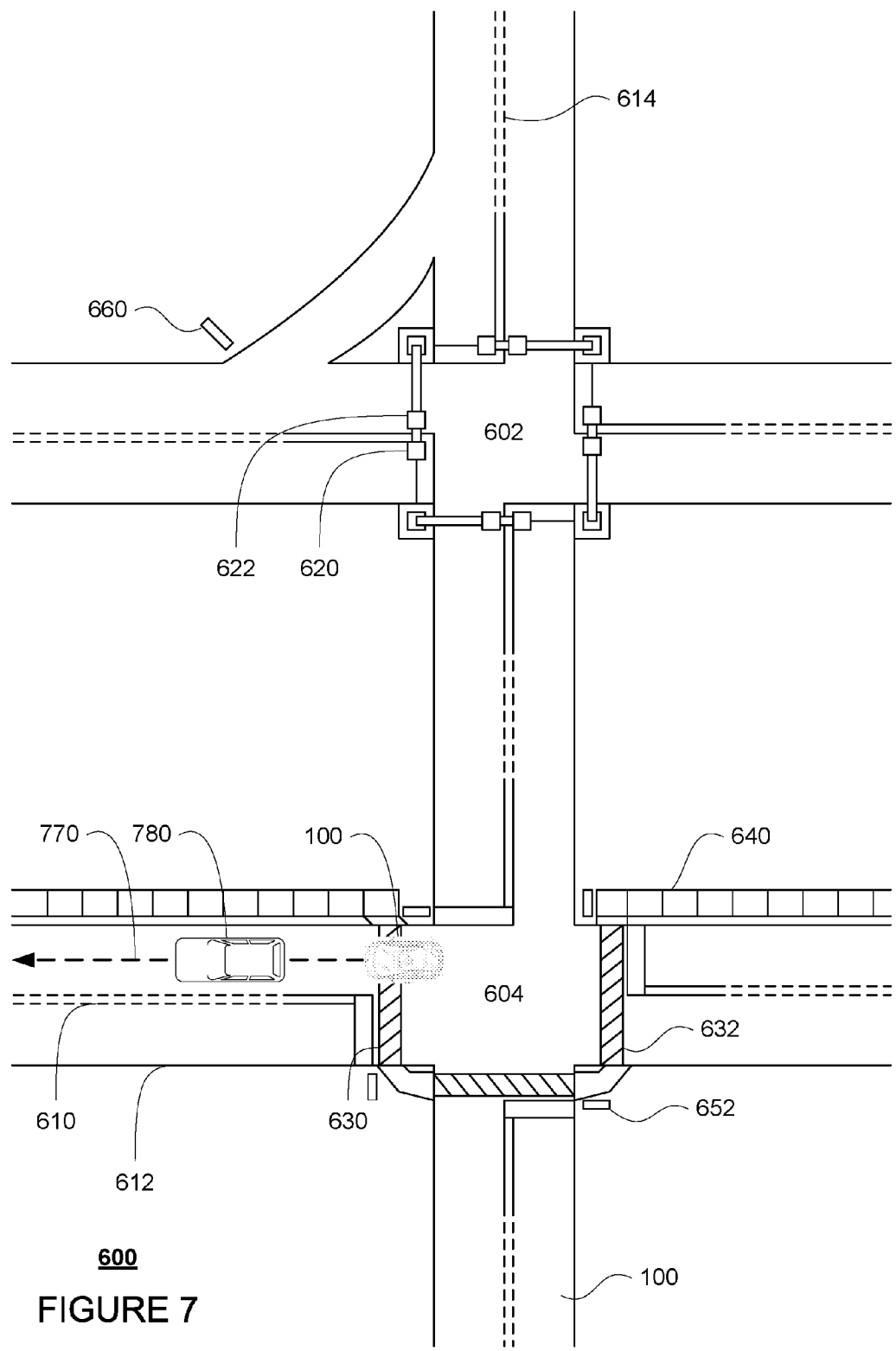
Figure 8:
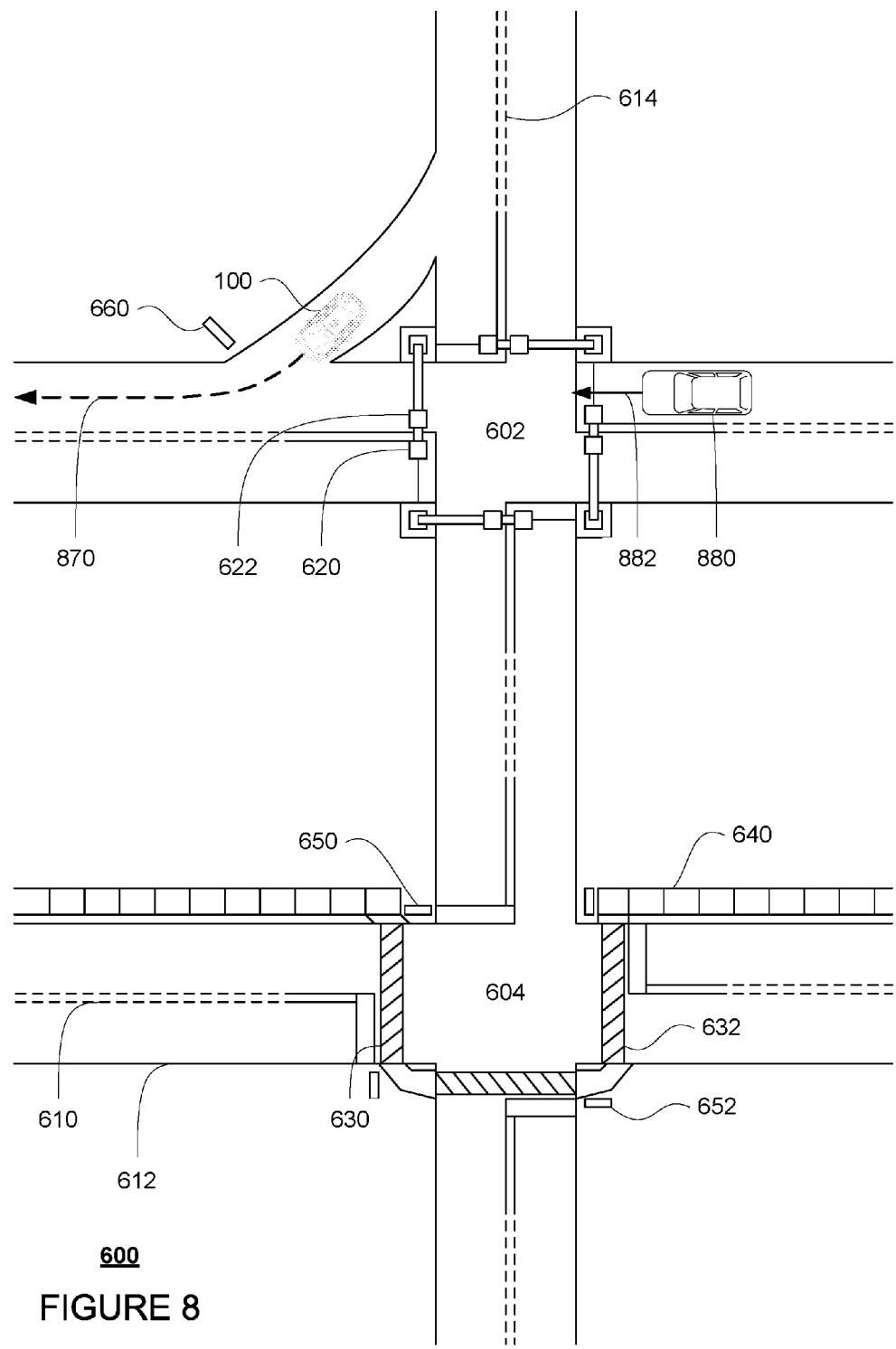

In the example of FIG. 6, vehicle 100 is driving towards intersection 604 and following a route that requires the vehicle 100 to make a left turn at intersection 604. The route is represented by dashed arrow 670. In the example of FIG. 7, vehicle 100 is driving out of and away from intersection 604 and following a route represented by dashed arrow 770. In the example of FIG. 8, vehicle is making a right turn and following a route represented by dashed arrow 870.

As the vehicle moves along the route towards the destination, the perception system 172 may provide the computing devices 110 with information about the vehicle's environment. This may include, for instance information identifying objects in the vehicle's environment and characteristics of those objects, such as type, location, speed, heading, size, shape, etc. For example, the computing device 110 may receive information identify other vehicles in the roadway, the type of the vehicles (passenger vehicle, bus, truck, etc.) as well as their speed, heading, size, etc. Returning to FIG. 6, as the vehicle 100 is approaching intersection 604, the computing devices 110 may receive information regarding the location of vehicle 680 as well as its type, speed, and heading (shown by the direction of arrow 682). In FIG. 7, as the vehicle 100 is maneuvering along the route 770, it is approaching vehicle 780 from behind. In this example, approaching intersection 604, the computing devices 110 may receive information regarding the location of vehicle 780 as well as its type, speed, and heading. In this example, the information may indicate that vehicle 780 is stopped or nearly stopped in the roadway or otherwise driving erratically, for instance, by swerving in the lane or driving partially on a shoulder, etc. In FIG. 8, as the vehicle 100 is maneuvering along the route 870, the computing devices 110 may receive information regarding the location of vehicle 880 as well as its type, speed, and heading (shown by the direction of arrow 882).

The computing devices 110 may also determine whether the action can be completed at a particular point in time, according to the accommodation protocols and without requiring a responsive action from another vehicle. In other words, the computing devices may determine whether the action is an assertive action as discussed above. For example, returning to FIG. 6, given the speed of vehicle 680 and the distance between vehicle 680 and intersection 604, there may not be enough time for the vehicle 100 to enter the intersection 604 and complete the left turn without coming too close to vehicle 680. In other words, assuming vehicle 680's speed were consistent, if vehicle 100 made a left turn in front of vehicle 680, the vehicles may come so close to one another that vehicle 100 would violate the accommodation protocols. Similarly, in the example of FIG. 8, if vehicle 100 made a right turn in front of vehicle 880 (for instance by merging onto the roadway in front of vehicle 880), the vehicles may come so close to one another that vehicle 100 would violate the accommodation protocols. In the example of FIG. 7, the vehicle 100 would typically not be able to pass vehicle 780 as the vehicles are driving on a two-lane road and passing would require vehicle 780 to cross lane lines 610 to enter the lane of opposing traffic and again would violate the accommodation protocols.

If the vehicle would not violate the accommodation protocols or require another vehicle to take a responsive action, the vehicle 100 could simply complete the action, as the action would not be considered assertive. However, where the accommodation protocols would be violated (or really, in all instances as such processing may be done continuously), the computing devices 110 may make a prediction about how another object would react to vehicle 100 attempting to complete the assertive action. For instance, the computing device 110 may generate a prediction that the other object will take a particular responsive action which would allow the vehicle 100 to comply with accommodation protocols of the first vehicle if the first vehicle were to complete the action at a particular point in time.

In these examples, the prediction may indicate that the autonomous vehicle would be able to complete the assertive action safely or while complying with the accommodation protocols if the other vehicle were to take the predicted responsive action. For instance, completing a left or right turn as in FIG. 6 or 8 would require that the vehicles not be a certain distance of one another, such as 5 or 10 meters, etc. depending upon the speed of the vehicles in order to comply with the accommodation protocols. In some instances, completing the turn may still comply with the accommodation protocols so long as the other vehicle took some responsive action, such as slowing down, etc. in order to maintain the minimum distance between the vehicles. Thus, because the action would require the other vehicle to take some responsive action, the action may be considered an assertive action. In this regard and as noted above, if the action was not an assertive action, the vehicle 100 would simply complete the action because the vehicle would be able to do so while complying with the accommodation protocols.

Turning to the example of FIG. 7, passing vehicle 780 safely may require that vehicle 100 do so as quickly as possible so that vehicle 100 spends as little time as possible in the lane of opposing traffic. Thus, because there is no open lane in the same direction of traffic, passing a vehicle by entering a lane of opposing traffic may always be considered an assertive action.

The predictions themselves may be based on the behavior models. For instance, regarding FIG. 6, the locations, headings and speeds of vehicles 100 and 680 with respect to the intersection 604 may be used as inputs to a behavior model for objects such as vehicles like vehicle 680 (i.e. small passenger vehicles). The behavior model may then provide a prediction about how the vehicle 680 would respond if vehicle 100 attempted to make the left turn in front of vehicle 680 (i.e. without waiting for vehicle 680 to pass through the intersection). For example, in the situation of FIG. 6, vehicle 680 may be expected to slow down if vehicle 100 were to attempt to make the left turn along route 670 in front of vehicle 680. Of course, by vehicle 680 slowing down, the vehicle 100 may be able to complete the action without violating the accommodation protocols. Thus, the left turn of FIG. 6 may be considered an assertive behavior. Similarly, if the vehicle 100 were to wait until vehicle 680 had passed vehicle 100 in the intersection, the left turn would not be considered an assertive behavior.

Regarding the example of FIG. 7, completing a passing maneuver around vehicle 780 safely may require that vehicle 100 do so as quickly as possible so that vehicle 100 spends as little time as possible in the lane of opposing traffic. The behavior model may predict that in order to complete the action safely, vehicle 780 must take one or more of various actions including slowing down, pulling towards the closest shoulder, changing lanes (where applicable), etc. In other words, if vehicle 780 were to speed up, this would make completing the action too dangerous, such that the computing device 110 would not complete the passing maneuver.

In the example of FIG. 8, the behavior model may provide a prediction about how the vehicle 880 would respond if vehicle 100 attempted to make the right turn in front of vehicle 880 (i.e. without waiting for vehicle 880 to pass by vehicle 100). For example, in the situation of FIG. 8, vehicle 880 may be expected to slow down if vehicle 100 were to attempt to make the right turn along route 870 in front of vehicle 880. Of course, by vehicle 880 slowing down, the vehicle 100 may be able to complete the action without violating the accommodation protocols. Thus, the right turn of FIG. 8 may be considered an assertive behavior. Similarly, if the vehicle 100 were to wait until vehicle 880 had passed vehicle 100 in the intersection, the left turn would not be considered an assertive behavior.

Next the vehicle may act to "test" the prediction for the assertive behavior. This action may include maneuvering the vehicle towards completing the action, but doing so very slowly, stopping (where appropriate), or slowing down so as to not fully commit to the assertive action. This act may be a very small step towards completing the action, but is sufficient to put the other vehicle on notice that the vehicle 100 intends to complete the assertive behavior. In other words, a very small movement towards completing the assertive action can put other human drivers on notice of the vehicle's "intention" to complete the assertive action as soon as possible. Moreover, because the vehicle still has time to make a decision as to whether or not to actually make the assertive action, the vehicle's computers can delay completing the assertive action and leave room to stop completely and not complete the assertive behavior.

Figure 9:
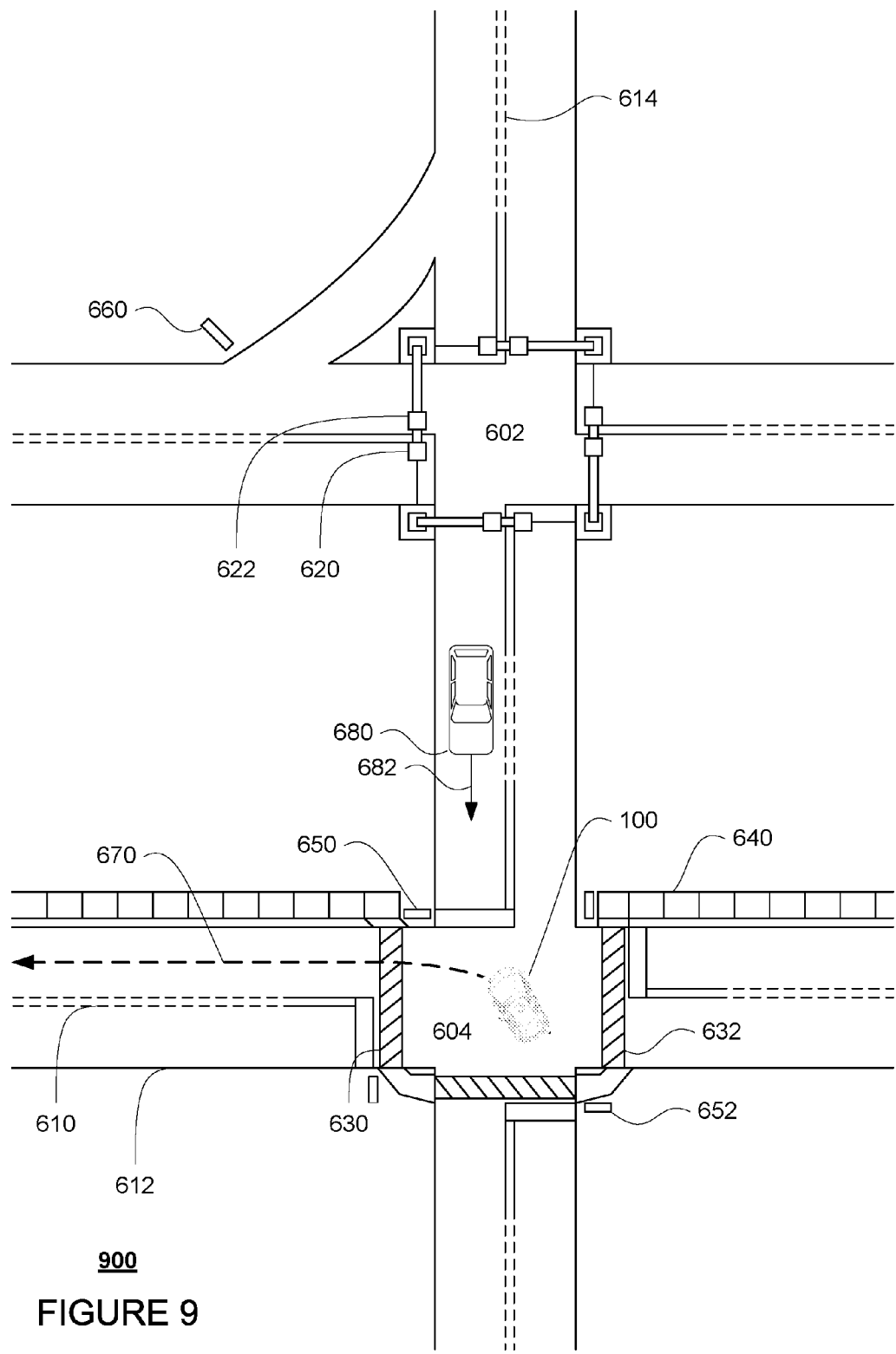

Turning to the example of FIG. 6, the computing devices 110 may move vehicle 100 to the position shown in example 900 of FIG. 9. Here, vehicle 100 has moved into the intersection 604 and angled itself towards the right turn. The positioning has vehicle 100 moved slightly towards and into the lane of vehicle 680, but still provides vehicle 680 with sufficient room to pass through the intersection 604 without colliding with vehicle 100. This positioning of the vehicle 100 may indicate to vehicle 680 (or to the driver of vehicle 680 as the case may be) that vehicle 100 intends to make a left turn. Other signals, such as a turn signal may also be used to indicate the intent of the vehicle's computing devices.

Figure 10:
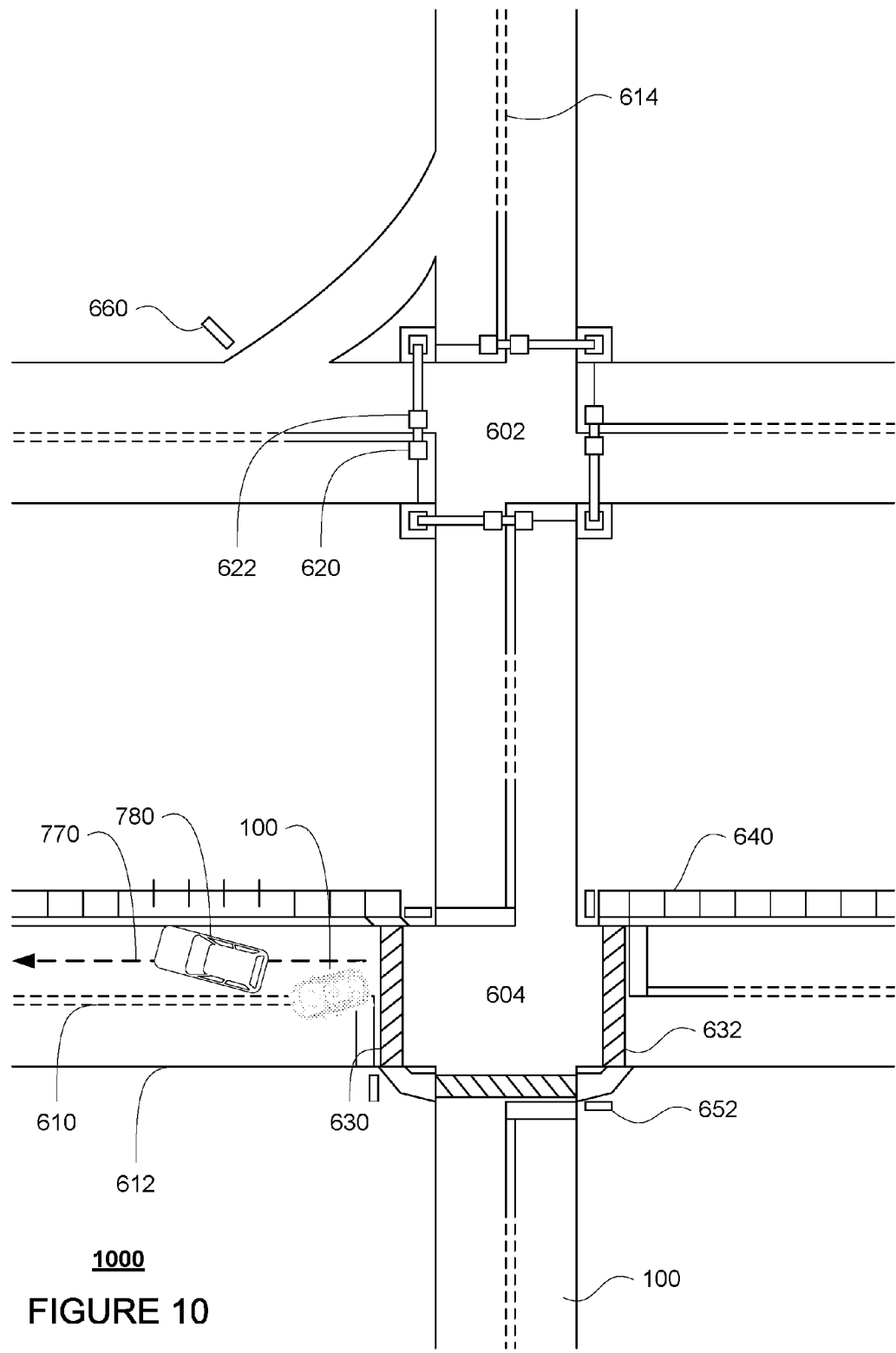

In the example of FIG. 7, the computing devices 110 may move vehicle 100 to the position shown in example 1000 of FIG. 10. Here, vehicle 100 has moved partially into the lane of opposing traffic and has increased its speed slightly to prepare to pass vehicle 780. This positioning of the vehicle 100 may indicate to vehicle 780 (or to the driver of vehicle 780 as the case may be) that vehicle 100 intends to pass vehicle 780. Again other signals, such as a turn signal may also be used to indicate the intent of the vehicle's computing devices.

Figure 11:
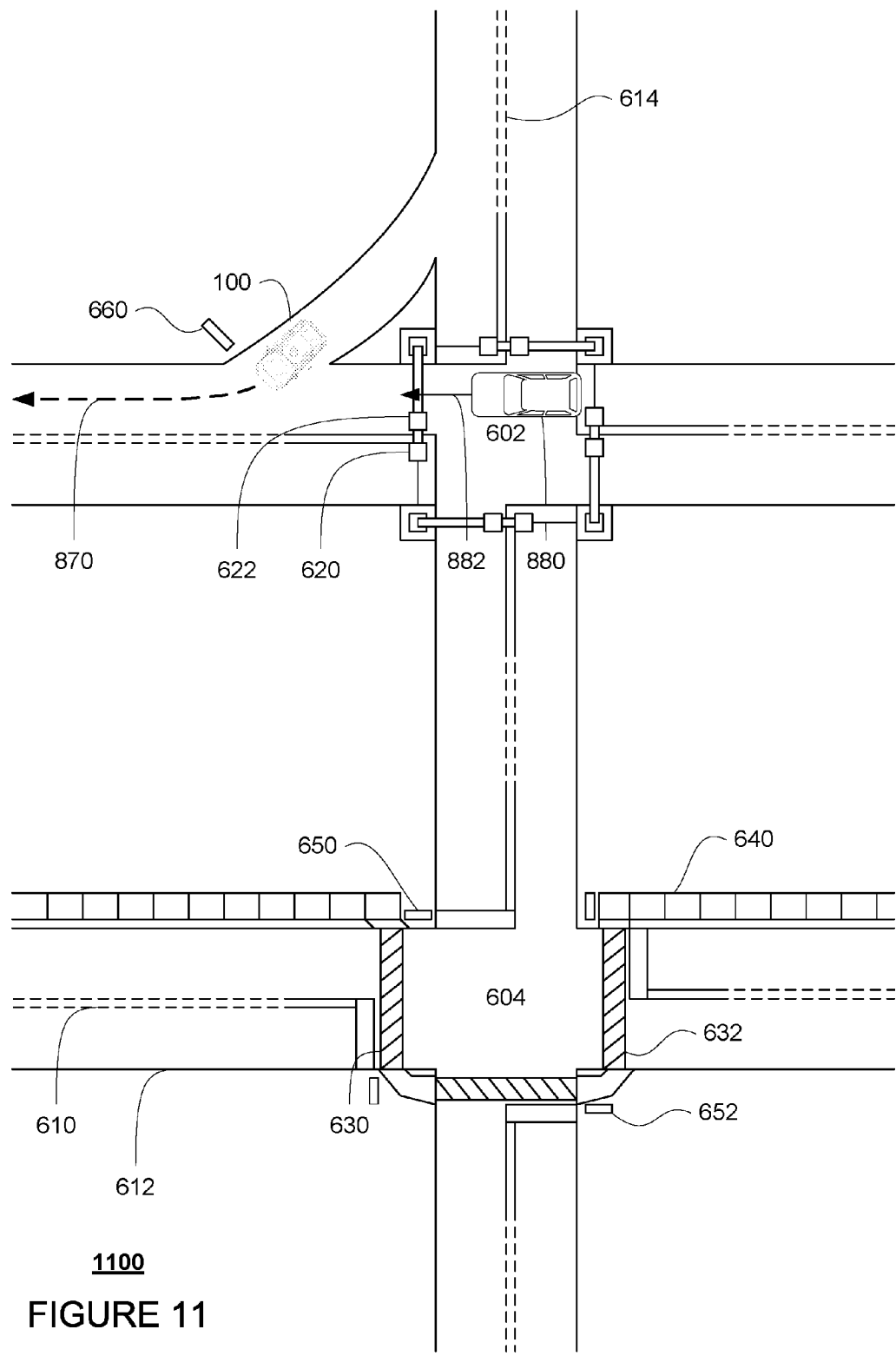

Returning to the example of FIG. 8, the computing devices 110 may move vehicle 100 to the position shown in example 1100 of FIG. 11. This positioning has vehicle 100 moved slightly towards and into the lane of vehicle 880, but still provides vehicle 880 with sufficient room to pass by vehicle 100 without colliding with vehicle 100. This positioning of the vehicle 100 may indicate to vehicle 880 (or to the driver of vehicle 880 as the case may be) that vehicle 100 intends to make a right turn. Other signals, such as a turn signal may also be used to indicate the intent of the vehicle's computing devices.

Once the vehicle has acted to test the prediction, the autonomous vehicle's computers may determine whether the other object has begun to take the responsive action according to the prediction. If this does not occur according to the prediction or occurs too late, because the vehicle 100 has only taken some small step towards the assertive action, the autonomous vehicle may "abort" the assertive action. In this way, the autonomous vehicle can act to prevent an accident or the vehicles coming too close to one another (e.g. within 5 or 10 meters as noted above). In this way, the autonomous vehicle can be more certain that the assertive behavior is understood by the other vehicle (or driver of the other vehicle) and can be completed safely.

For instance in FIG. 9, as vehicle 100 moves into intersection 604, vehicle 680 also moves closer to intersection 604 (compare with FIG. 6). If vehicle 680 has slowed down to a particular speed or at a particular rate of deceleration that meets the predicted responsive action (in other words, that vehicle 680 has slowed down enough), vehicle 100 may simply complete the assertive action and making the left turn without waiting for vehicle 680 to pass vehicle 100 or through the intersection. If vehicle does not take an action that meets the predicted responsive action, for instance, if vehicle 680 does not slow down enough or speeds up, vehicle 100 may abort the assertive action and simply wait for vehicle 680 to pass vehicle 100 before making the left turn.

Turning to FIG. 10, as vehicle 100 moves into the lane of opposing traffic, vehicle 780 may move forward slightly or remain stopped (or as in the other example, continue to drive erratically). If vehicle 780 has slowed down to a particular speed or at a particular rate of deceleration or pulls towards a shoulder in a way that meets the predicted responsive action, vehicle 100 may simply complete the assertive action and pass vehicle 780 using the lane of opposing traffic. If vehicle does not take an action that meets the predicted responsive action, for instance, if vehicle 680 does not slow down enough, speeds up, or moves towards lane lines 610, vehicle 100 may abort the assertive action and pull back into the lane of vehicle 780. Of course, vehicle 100 may attempt the passing maneuver again in the future.

Regarding FIG. 11, as vehicle 100 moves into the lane of vehicle 880, vehicle 880 also moves into intersection 604 (compare with FIG. 8). If vehicle 880 has slowed down to a particular speed or at a particular rate of deceleration that meets the predicted responsive action, vehicle 100 may simply complete the assertive action and make the right turn without waiting for vehicle 880 to pass vehicle 100. If vehicle does not take an action that meets the predicted responsive action, for instance, if vehicle 880 does not slow down enough or speeds up, vehicle 100 may abort the assertive action and simply wait for vehicle 880 to pass vehicle 100 before making the right turn.

In addition, predictions for various other types of assertive maneuvers may be made and tested in accordance with the examples above. For instance, when vehicle 100 is proceeding into a bottleneck, such as where a garbage truck, emergency vehicle, or construction is partially blocking a lane of a two-lane road, the computing devices may make and test predictions about the reaction of other vehicles. This may require vehicle 100 to take an assertive action by driving partially into the lane of oncoming traffic in order to move around the object or move as far right as possible to give an oncoming vehicle enough room to pass the object as well. In this example, the computing devices may predict that the other vehicle will or will not provide vehicle 100 with enough room to safely pass the object, and the computing devices may test the prediction by beginning to move the vehicle 100 around the object slowly and waiting for the oncoming vehicle to react according to the prediction before completing the assertive action.

In another example, predictions may be made and tested when finding a gap between two vehicles. For instance, when the vehicle 100 needs to change to an adjacent lane, but there is not sufficient room according to the accommodation protocols between two vehicles in the adjacent lane. In this example, the computing devices may predict whether the two vehicles will increase the gap if the vehicle 100 begins to move towards the gap. Again, the computing devices may test the prediction by beginning to move the vehicle towards the gap and using a turn signal to indicate that the vehicle intends to move between the two vehicles. The computing devices may wait to complete the assertive action until one or both of the two vehicles begins to react (for instance by closing, maintaining, or increasing the gap).

In yet another example, the computing devices may make and test predictions when stopped before proceeding through an intersection with a multi-way stop (i.e. a four or two-way stop), where there is another vehicle also stopped at the intersection. In this example, the computing devices may predict whether the other vehicle will allow vehicle 100 to proceed first. Again, the computing devices may maneuver the vehicle in order to test the prediction, for instance, but rolling vehicle 100 into the intersection and waiting to complete the assertive action until the other vehicle begins to react (for instance, by also proceeding into the intersection or remaining stationary).

Figure 12:
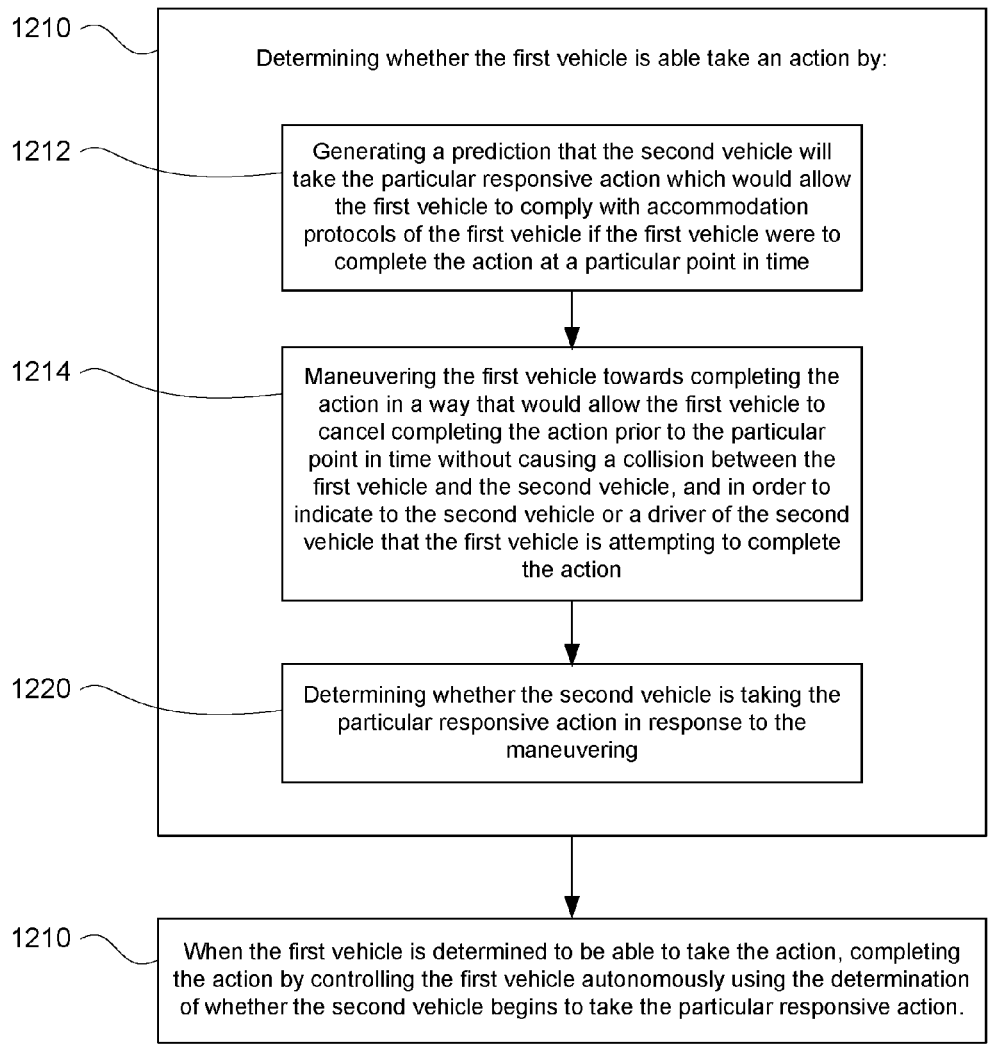
FIG. 12 is a flow diagram in accordance with aspects of the disclosure.

FIG. 12 is an example flow diagram 1200 of controlling a first vehicle, such as vehicle 100, autonomously which may be performed by one or more computing devices, such as computing device 110. In this example, the one or more computing devices determine whether the first vehicle is able to take an action at block 1210. This is achieved by generating a prediction that the second vehicle will take the particular responsive action which would allow the first vehicle to comply with accommodation protocols of the first vehicle if the first vehicle were to complete the action at a particular point in time as shown in block 1212; maneuvering the first vehicle towards completing the action in a way that would allow the first vehicle to cancel completing the action prior to the particular point in time without causing a collision between the first vehicle and the second vehicle, and in order to indicate to the second vehicle or a driver of the second vehicle that the first vehicle is attempting to complete the action as shown in block 1214; and determining whether the second vehicle is taking the particular responsive action in response to the maneuvering as shown in block 1216. Next, as shown in block 1220, when the first vehicle is determined to be able to take the action, the action is completed by controlling the first vehicle autonomously using the determination of whether the second vehicle begins to take the particular responsive action.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a first vehicle autonomously, the method comprising:
   planning, by one or more processors, to maneuver the first vehicle to autonomously complete an assertive action with respect to a second vehicle;
   predicting that the second vehicle will take a particular responsive action based on the assertive action;
   maneuvering, by the one or more processors, the first vehicle towards completing the assertive action by initiating a movement towards completing the assertive action in a way that would allow the first vehicle to cancel completing the assertive action without causing a collision between the first vehicle and the second vehicle, and in order to indicate to the second vehicle or a driver of the second vehicle that the first vehicle is attempting to complete the assertive action;

determining, by the one or more processors, whether the second vehicle is taking the particular responsive action in response to the maneuvering;

determining, by the one or more processors, whether the first vehicle is able to take the assertive action; and when the first vehicle is determined to be able to take the assertive action, completing the assertive action, by the one or more processors, by controlling the first vehicle autonomously using the determination of whether the second vehicle begins to take the particular responsive action.

2. The method of claim 1, wherein the assertive action is making a right turn from a first roadway to a second roadway in order to pull in front of the second vehicle on the second roadway.

3. The method of claim 1, wherein the assertive action is making a left turn from a first roadway to leave the first roadway and requires crossing in front of the second vehicle on the first roadway.

4. The method of claim 3, wherein the assertive action is making a left turn into a parking lot or driveway.

5. The method of claim 3, wherein the assertive action is making a left turn onto a second roadway at an intersection.

6. The method of claim 1, wherein the second vehicle is in a same lane as the first vehicle and the assertive action is passing the second vehicle.

7. The method of claim 1, wherein the particular responsive action includes slowing the second vehicle down to a particular speed.

8. The method of claim 1, wherein the particular responsive action includes changing a current lane of the second vehicle.

9. The method of claim 1, wherein when the second vehicle is determined to have begun to take the particular responsive action, the assertive action is completed before a time when the second vehicle would have passed by the first vehicle had the first vehicle not completed the assertive action.

10. The method of claim 1, further comprising:
controlling, by the one or more processors, the first vehicle autonomously along a route; and
prior to maneuver the first vehicle to complete the assertive action, determining, by the one or more processors, that the first vehicle must take the assertive action to proceed along the route.

11. The method of claim 1, wherein predicting that the second vehicle will take the responsive action includes generating a prediction that the second vehicle will take the particular responsive action which would allow the first vehicle to comply with accommodation protocols of the first vehicle if the first vehicle were to complete the assertive action at a particular point in time, wherein the accommodation protocols prohibit actions by the first vehicle which would require certain types of responsive actions by another vehicle.

12. A system for controlling a first vehicle autonomously, the system comprising one or more processors configured to:
plan to maneuver the first vehicle to autonomously complete an assertive action with respect to a second vehicle;
predict that the second vehicle will take a particular responsive action based on the assertive action;
maneuver the first vehicle towards completing the assertive action by initiating a movement towards completing the assertive action in a way that would allow the first vehicle to cancel completing the assertive action without causing a collision between the first vehicle and the second vehicle, and in order to indicate to the second vehicle or a driver of the second vehicle that the first vehicle is attempting to complete the assertive action;
determine whether the second vehicle is taking the particular responsive action in response to the maneuvering; determine whether the first vehicle is able to take the assertive action; and
when the first vehicle is determined to be able to take the assertive action, complete the assertive action by controlling the first vehicle autonomously using the determination of whether the second vehicle begins to take the particular responsive action.

13. The system of claim 12, wherein the particular responsive action includes slowing the second vehicle down to a particular speed.

14. The system of claim 12, wherein the particular responsive action includes changing a current lane of the second vehicle.

15. The system of claim 12, wherein when the second vehicle is determined to have begun to take the particular responsive action, the one or more processors are configured to complete the assertive action before a time when the second vehicle would have passed by the first vehicle had the first vehicle not completed the assertive action.

16. The system of claim 12, wherein the one or more processors are further configured to, prior to the maneuvering, predict that the second vehicle is likely to take the particular responsive action.

17. The system of claim 12, wherein the assertive action is making a right turn from a first roadway to a second roadway in order to pull in front of the second vehicle on the second roadway.

18. The system of claim 12, wherein the assertive action is making a left turn from a first roadway to leave the first roadway and requires crossing in front of the second vehicle on the first roadway.

19. The system of claim 12, wherein the assertive action is making a left turn into a parking lot or driveway.

20. A non-transitory computer readable storage medium on which instructions are stored, the instructions, when executed by one or more processors cause the one or more processors to perform a method of controlling a first vehicle autonomously, the method comprising:
planning, by one or more processors, to maneuver the first vehicle to autonomously complete an assertive action with respect to a second vehicle;
predicting that the second vehicle will take a particular responsive action based on the the assertive action;
maneuvering, by the one or more processors, the first vehicle towards completing the assertive action by initiating a movement towards completing the assertive action in a way that would allow the first vehicle to cancel completing the assertive action without causing a collision between the first vehicle and the second vehicle, and in order to indicate to the second vehicle or a driver of the second vehicle that the first vehicle is attempting to complete the assertive action;
determining, by the one or more processors, whether the second vehicle is taking the particular responsive action in response to the maneuvering;

determining whether the first vehicle is able to take the assertive action; and when the first vehicle is determined to be able to take the assertive action, completing the assertive action, by the one or more processors, by controlling the first vehicle autonomously using the determination of whether the second vehicle begins to take the particular responsive action.

* * * * *